United States Patent
Baccouche et al.

(10) Patent No.: US 10,272,948 B2
(45) Date of Patent: Apr. 30, 2019

(54) FRONT RAIL FOR VEHICLE UNDERBODY ASSEMBLY WITH VARIED STRENGTH ZONES

(71) Applicant: Ford Global Technologies, LLC, Dearborn, MI (US)

(72) Inventors: Mohamed Ridha Baccouche, Ann Arbor, MI (US); Raj Sohmshetty, Canton, MI (US); Saied Nusier, Canton, MI (US); Rohit Telukunta, Madison Heights, MI (US); Sridhar Santi Boyina, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 19 days.

(21) Appl. No.: 15/625,317

(22) Filed: Jun. 16, 2017

(65) Prior Publication Data

US 2018/0362088 A1    Dec. 20, 2018

(51) Int. Cl.

| | |
|---|---|
| *B62D 21/15* | (2006.01) |
| *B62D 25/04* | (2006.01) |
| *B62D 25/08* | (2006.01) |
| *B21D 22/02* | (2006.01) |
| *B21D 53/88* | (2006.01) |
| *C21D 9/46* | (2006.01) |
| *C21D 1/673* | (2006.01) |
| *B60R 19/34* | (2006.01) |
| *B62D 21/02* | (2006.01) |
| *B62D 29/00* | (2006.01) |

(Continued)

(52) U.S. Cl.
CPC ......... *B62D 21/152* (2013.01); *B21D 22/022* (2013.01); *B21D 47/00* (2013.01); *B21D 53/88* (2013.01); *B60R 19/03* (2013.01); *B60R 19/34* (2013.01); *B62D 21/02* (2013.01); *B62D 25/04* (2013.01); *B62D 25/085* (2013.01); *B62D 29/007* (2013.01); *C21D 1/673* (2013.01); *C21D 9/46* (2013.01); *C21D 2211/001* (2013.01)

(58) Field of Classification Search
CPC .... B62D 21/152; B62D 25/04; B62D 25/082; B62D 25/085; B62D 25/08; B21D 22/022; B21D 53/88
See application file for complete search history.

(56) References Cited

U.S. PATENT DOCUMENTS

| | | | |
|---|---|---|---|
| 7,475,478 | B2 | 1/2009 | McCrink et al. |
| 7,695,052 | B2 | 4/2010 | Nusier et al. |
| 8,555,507 | B2 | 10/2013 | Lee et al. |
| 8,691,032 | B2 | 4/2014 | Thomas et al. |

(Continued)

*Primary Examiner* — Gregory A Blankenship
(74) *Attorney, Agent, or Firm* — Vichit Chea; Brooks Kushman, P.C.

(57) ABSTRACT

A vehicle underbody assembly may include a pair of front rails, a pair of hinge pillars, a pair of crush cans, a pair of bumper supports, and a bumper. Each of the front rails includes a front portion, a mid-portion, and a backup portion. Each of the hinge pillars may be attached to one of the backup portions. Each of the crush cans may be attached to one of the front portions. Each of bumper supports may be secured to one of the crush cans. The bumper may be attached to the bumper supports. The front portions and the backup portions may be heat treated to have a higher strength than the mid-portions. Each of the front portions and the backup portions may be heated to define a hard strength zone and the mid-portion may be heated to define a medium strength zone.

18 Claims, 6 Drawing Sheets

(51) Int. Cl.
    *B60R 19/03*        (2006.01)
    *B21D 47/00*        (2006.01)

(56)            References Cited

U.S. PATENT DOCUMENTS

| | | | |
|---|---|---|---|
| 9,738,320 B2* | 8/2017 | Miyamoto | B62D 21/152 |
| 2007/0107819 A1* | 5/2007 | Gehringhoff | B62D 21/152 |
| | | | 148/639 |
| 2008/0174150 A1* | 7/2008 | Yamada | B62D 21/152 |
| | | | 296/203.01 |
| 2010/0084892 A1* | 4/2010 | Yoshida | B21D 7/08 |
| | | | 296/203.02 |
| 2010/0117403 A1* | 5/2010 | Kihara | B62D 21/152 |
| | | | 296/203.02 |
| 2012/0152675 A1* | 6/2012 | Mori | B62D 21/152 |
| | | | 188/377 |
| 2012/0248820 A1* | 10/2012 | Yasui | B60R 19/34 |
| | | | 296/187.09 |
| 2014/0015280 A1* | 1/2014 | Ohta | B62D 21/152 |
| | | | 296/187.08 |
| 2014/0084634 A1* | 3/2014 | Suzuki | B62D 25/082 |
| | | | 296/205 |
| 2014/0239671 A1* | 8/2014 | Mori | B62D 21/152 |
| | | | 296/187.09 |
| 2016/0362139 A1* | 12/2016 | Sekiguchi | B62D 21/152 |
| 2016/0368536 A1* | 12/2016 | Cazes | C21D 9/0068 |
| 2017/0050598 A1* | 2/2017 | Taguchi | B60R 19/42 |
| 2017/0057548 A1* | 3/2017 | Yamada | B62D 25/087 |
| 2017/0113726 A1* | 4/2017 | Matsushima | B62D 21/152 |
| 2017/0210425 A1* | 7/2017 | Sekiguchi | B62D 25/08 |
| 2017/0259851 A1* | 9/2017 | Higuchi | B62D 21/15 |
| 2017/0341684 A1* | 11/2017 | Goldyn | B62D 25/04 |
| 2018/0201323 A1* | 7/2018 | Onoda | B62D 21/152 |

* cited by examiner

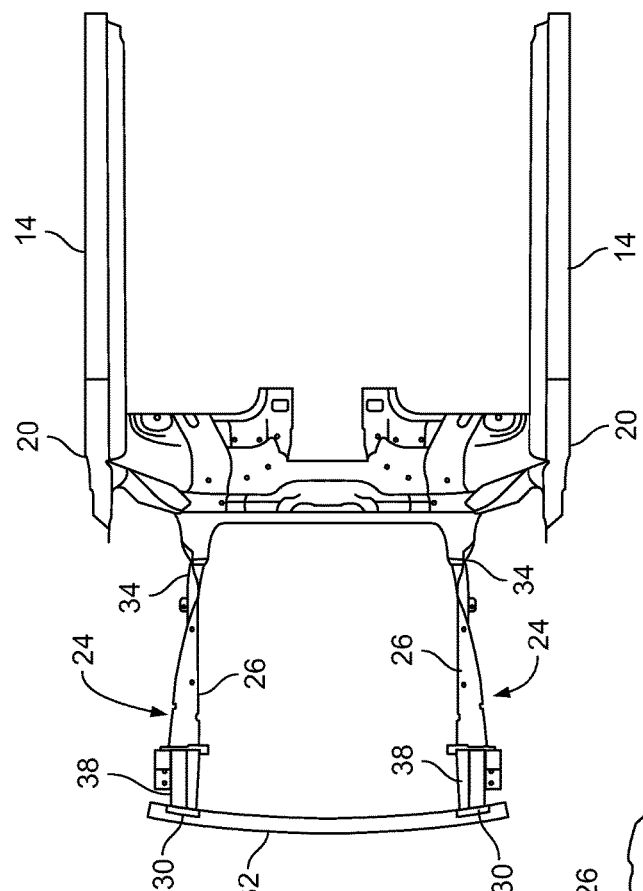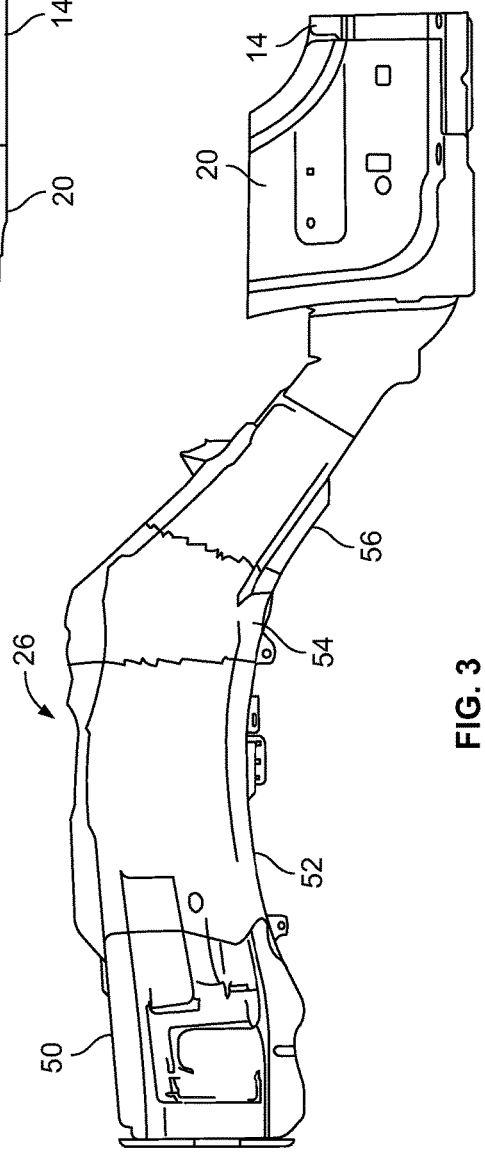

FRONT RAIL FOR VEHICLE UNDERBODY ASSEMBLY WITH VARIED STRENGTH ZONES

TECHNICAL FIELD

This disclosure relates to an assembly for a vehicle underbody assembly including a front rail thermally treated to form varied strength zones.

BACKGROUND

Automotive manufacturers are driven to design light weight vehicles with increased crash performance and reduced fuel consumption. The manufacturers have transitioned from a usage of mild steels for vehicle components to advanced high strength steels and ultra-high strength steels along with aluminum. Hot stamping processes for vehicle components allow creation of fully martensitic structures. However, the hot stamping process may create vehicle components with undesirable qualities. For example, the hot stamping process may result in vehicle components having joining issues with steel alloys and aluminum, in vehicle components requiring a high strength cutter for blanking operations, in vehicle components having an uneven coating thickness, and in vehicle components having non-equilibrium microstructures.

SUMMARY

A vehicle underbody assembly includes a pair of front rails, a pair of hinge pillars, a pair of crush cans, a pair of bumper supports, and a bumper. Each of the front rails includes a front portion, a mid-portion, and a backup portion. Each of the hinge pillars is attached to one of the backup portions. Each of the crush cans is attached to one of the front portions. Each of bumper supports is secured to one of the crush cans. The bumper is attached to the bumper supports. The front portions and the backup portions are heat treated to have a higher strength than the mid-portions. Each of the mid-portions may have a strength tuned for hinge creation to absorb energy and minimize deformation into a respective rocker mounted to one of the hinge pillars and to absorb energy and minimize deformation into the respective hinge pillar when the bumper is subjected to an impact. Each of the front portions and each of the backup portions may have a strength tuned to consolidate inner and outer reinforcements parts into inner and outer reinforcements of advanced high strength steel to support a vehicle power train and to balance an offset in load direction due to an outboard extending geometry of each of the front rails to the respective hinge pillar. Each of the front rails may be hot stamped and then cooled at a rate higher than a critical cooling rate to achieve a substantially full martensitic structure of the front portions and the backup portions. Each of the front portions and the backup portions may be heated to define a hard strength zone and the mid-portion may be heated to define a medium strength zone. Each of the mid-portions may span onto either side of a bend-portion of the respective front rail transitioning from the respective front portion to the respective backup portion. A region between one of the front portions and one of the backup portions may be further defined as a location in which an upper end of the respective backup portion extends downward from the respective front portion. Each of the front rails may be thermally treated so that the mid-portion has a tensile strength less than the respective front portion and the respective backup portion or less than 1000 MPa. Each of the front rails may be thermally treated so that each of the front portions and the backup portions have a tensile strength greater than the mid-portions or between 1000 MPa and 1900 MPa.

A front rail for a vehicle underbody assembly includes a front portion, a backup portion, and a mid-portion. The front portion is for securing to a bumper assembly. The backup portion is for securing to a hinge pillar. The mid-portion extends between the front portion and backup portion and is thermally treated to define a medium strength zone. The front portion and the backup portion are thermally treated to define a hard strength zone. The mid-portion may be located adjacent an outboard extension of the backup portion and may be thermally treated to provide an area for hinge creation to absorb energy from a vehicle front end impact. The medium strength zone may be further defined as a zone in which a structure of the front rail includes portions of one or more of ferrite, pearlite, martensite, and bainite. The hard strength zone may be further defined as a zone in which a structure of the front rail is martensitic. The front portion may include a front end for securing to a crush can. The mid-portion may be cooled at a first cooling rate less than a second cooling rate of the front portion and the backup portion. Thermal treatment of the portions may include a heating process in which the front portion and the backup portion are heated to define the hard strength zone. Thermal treatment of the portions may include a heating process in which the mid-portion is heated to define a medium strength zone. The mid-portion may be heated to define a microstructure including one or more of ferrite, pearlite, martensite, and bainite.

A method for creating a vehicle component includes heating a first portion of a blank to a first temperature to define a first strength zone; heating a second portion of the blank to a second temperature to define a second strength zone; and transferring the blank after heating to a die to form a vehicle front rail. The second strength zone is a medium strength zone spanning on either side of a transition portion of the vehicle front rail extending between a front portion and a backup portion. The first temperature may be above an upper critical temperature of the blank. The first strength zone may be a hard strength zone including the front portion and the backup portion. The second temperature may be between a lower critical temperature and an upper critical temperature of the blank.

BRIEF DESCRIPTION OF THE DRAWINGS

FIG. 2 is a top plan view of a portion of the vehicle body of FIG. 1 including an example of a front rail.

FIG. 3 is a side elevation view of the front rail of FIG. 2.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be used in particular applications or implementations.

Figure 1:
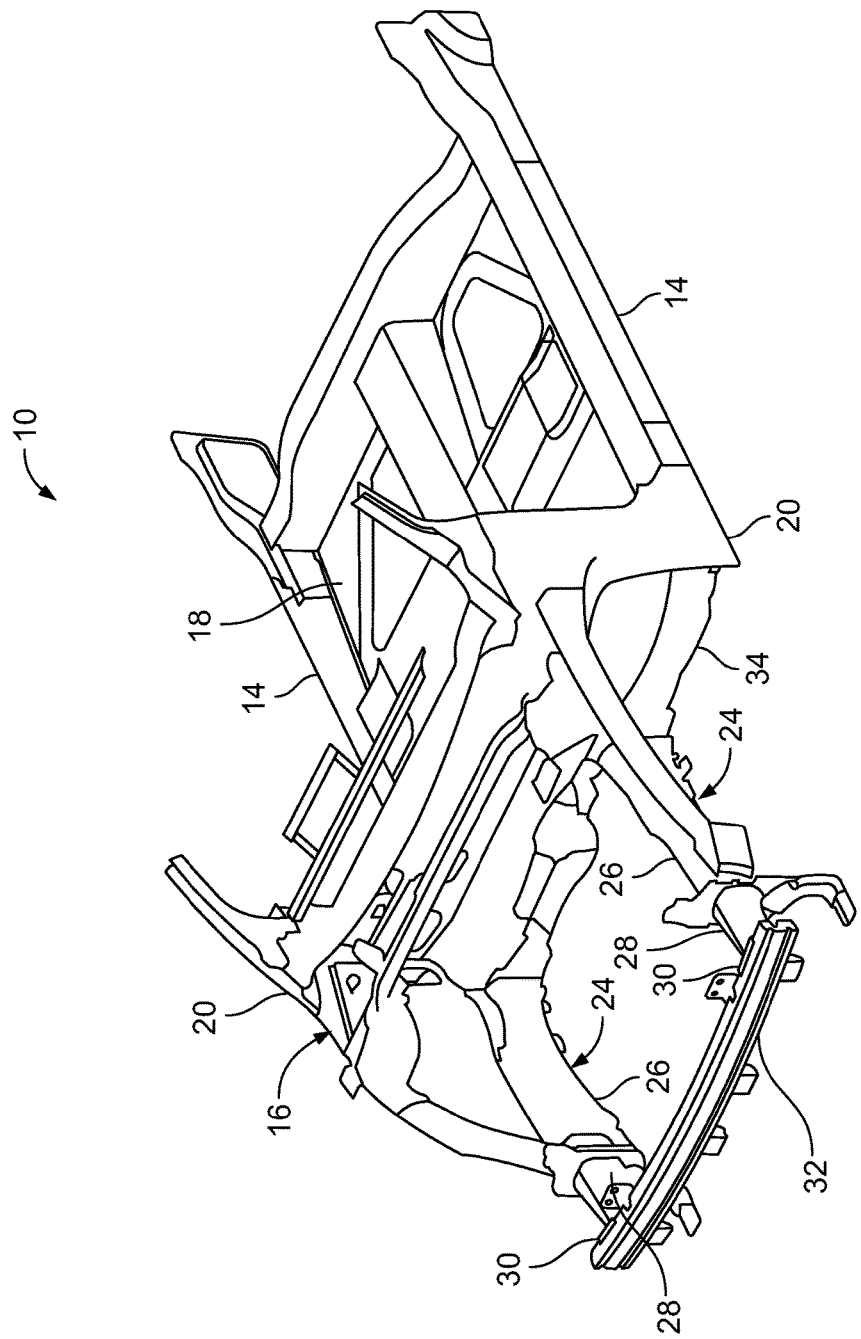
FIG. 1 is a front perspective view of an example of a portion of a vehicle body.

FIG. 1 shows an example of a portion of a vehicle body, generally referred to as a vehicle body 10 herein. The vehicle body 10 includes a pair of rockers 14 and an engine compartment 16. A floor panel member 18 is disposed between the pair of rockers 14. The floor panel member 18 and the pair of rockers 14 assist in supporting a vehicle cabin. Each of the rockers 14 is secured to the engine compartment 16 by one of a pair of hinge pillars 20. The engine compartment 16 includes a pair of underbody assemblies 24. Each of the underbody assemblies 24 includes a front rail 26, a crush can 28, a bumper support 30, a bumper beam 32, and a backup structure 34. The front rail 26 assists in supporting a vehicle power train (not shown) housed within the engine compartment 16 and in protecting vehicle occupants. For example, the front rail 26 absorbs and manages impact energy by deforming and hinging when subjected to an impact. The crush cans 28, the bumper supports 30, and the bumper beam 32 comprise a bumper assembly. Each of the crush cans 28 may be secured to one of the front rails 26. Each of the bumper supports 30 may be disposed between the bumper beam 32 and the crush cans 28. Each of the backup structures 34 may span between the front rail 26 and the hinge pillar 20.

Each of the front rails 26 may be hollow tubes made of a high strength low-alloy steel (HSLA) 350, dual phase (DP) 600, or DP780 manufactured using hydroforming or multiple stamped pieces. Each of the crush cans 28 may be made of HSLA350, DP600, or DP780 in an assembly of multiple stamped components welded to one another. Alternatively, each of the crush cans 28 may be formed as a single component with the respective front rail 26. The bumper beam 32 may be made of boron or martensitic steels via a hot stamping process. Each of the backup structures 34 may be made of higher strength steels such as DP980, DP1180, or hot stamped boron steels.

Figure 4:
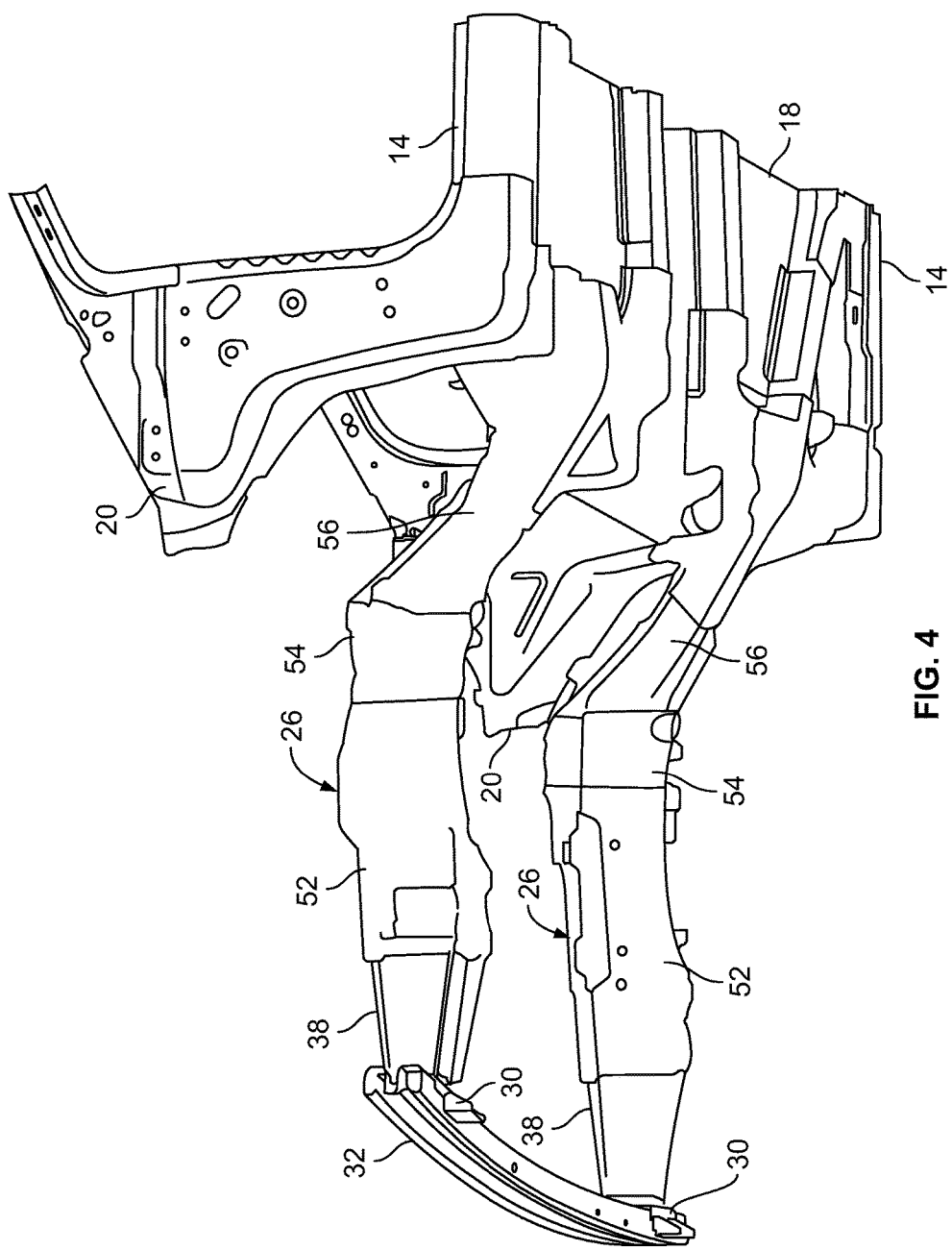
FIG. 4 is a lower perspective view of a portion of the vehicle body of FIG. 1.

FIG. 2 shows a top view of the vehicle body 10 with components removed to better show the underbody assemblies 24 arranged with the rockers 14. FIG. 3 shows a portion of one of the underbody assemblies 24. FIG. 4 shows a lower perspective view of the underbody assemblies 24.

Referring to FIGS. 2 through 4, the front rail 26 and the backup structure 34 are formed as a single component. The front rail 26 may be formed by a monolithic hot stamping process (further described below) to form various strength zones along the front rail 26. For example, the front rail 26 may include a first zone 50, a second zone 52, a third zone 54, and a fourth zone 56. The third zone 54 extends between the second zone 52 and the fourth zone 56. The third zone 54 may be located at a portion of the front rail 26 including a bend at a transition between a front portion of the front rail 26 and an upper end of the backup structure 34.

The first zone 50 may be a soft strength zone having a tensile strength of 400 to 600 MPa. The second zone 52 and the fourth zone 56 may be treated to form a hard strength zone having a tensile strength of 1000 to 1900 MPa. The third zone 54 may be treated to form a medium strength zone having a tensile strength less than 1000 MPa. The zone identifiers may be defined by a microstructure of the respective zone due to thermal treatment. For example, a hard strength zone may have a fully martensitic microstructure, a soft strength zone may have a ferrite and/or pearlite microstructure, and a medium strength zone may have a microstructure including one or more of ferrite, pearlite, martensite, and bainite.

Portions of a blank may be heated to define the different strength zones through either uniform or tailored heating. With uniform heating, the blank may be heated above an austenetizing temperature, referred to as Ac3. A temperature range associated with Ac3 may be between 800 and 850 degrees Celsius. With tailored heating, different portions of the blank may be heated to different temperatures to define various strength zones, such as hard, medium, and soft.

Alternatively, portions of a blank may be cooled at different rates to define different strength zones. The hard strength zone may be quenched above a critical cooling rate, such as a rate of 100 degrees Celsius per second (C/s). The critical cooling rate is a minimum continuous cooling rate to prevent undesired phase transformation of the blank. For example, the critical cooling rate for the front rail 26 may be between 28 and 30 C/s. A medium strength zone may be a zone including a partially austenitized portion of a component cooled at a rate below the critical cooling rate, such as a rate between 10 and 20 C/s. A soft strength zone may be a zone in which the component has characteristics as delivered and in which the component is not austenitized. The front rail 26 may be formed by thermal treatment so that the first zone 50 is a soft strength zone, the second zone 52 and the fourth zone 56 are hard strength zones, and the third zone 54 is a medium strength zone. Other configurations for the varied zones along the front rail 26 are available.

Thermally treating the second zone 52 to form a hard strength zone allows for the consolidation of separate inner and outer reinforcement parts of engine and transmission attachment brackets into a single inner and outer part such as an inner rail and an outer rail. The inner and outer part may be of advanced high strength steel (AHSS) material having strength characteristics to facilitate supporting a vehicle powertrain.

The consolidated reinforcement brackets may have a strength to support a geometry change at a location in which a front portion of the front rail 26 transitions to the backup structure 34 to balance an offset in load direction. For example, the front rail 26 may be a closed hollow section that transitions from a substantially straight portion extending rearward and then downward and outboard to meet a vehicle pillar or rocker. A rear portion of the front rail 26 may be subject to a large bending moment due to the geometry change (downward and outboard). In prior art examples, the portion of the rail with the geometry change is typically reinforced with brackets to control deformation. In this example, the backup structure 34 extends longitudinally and outboard relative to the vehicle body 10. The front rail 26 has a reduced number of components and joints compared to prior art front rails so fewer joining operations are required for assembly.

Thermally treating the third zone 54 to form a medium strength zone may create a lower strength material area for creating a "living hinge" or hinge joint to absorb energy and minimize deformation into the rocker 14, the hinge pillar 20, and a vehicle cabin when the front rail 26 or bumper beam 32 is subjected to an impact.

Figure 5:
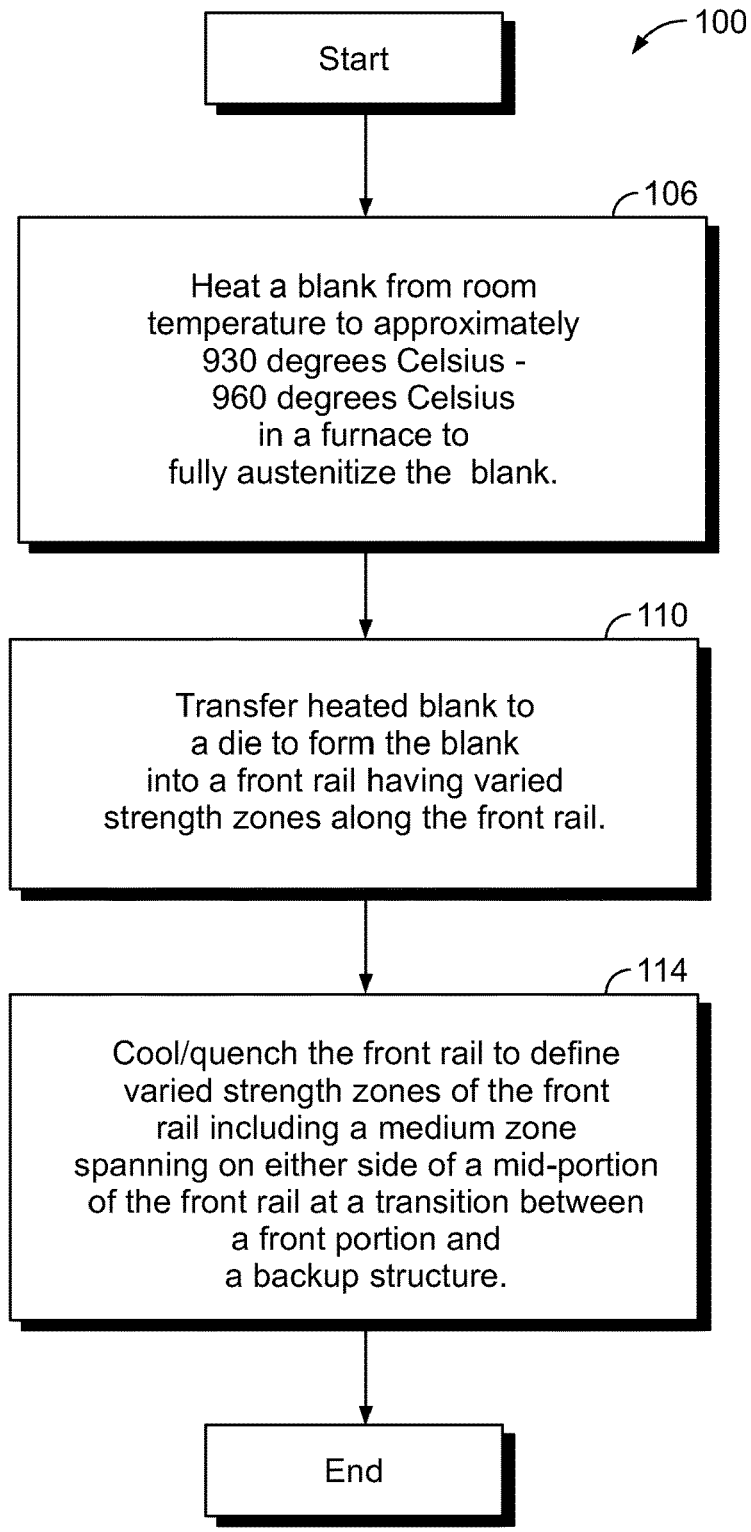
FIG. 5 is a flow chart showing an example of a method for creating a vehicle component.

FIG. 5 is a flow chart illustrating an example of a method of thermally treating a blank using a monolithic hot stamping process, referred to generally as a method 100. As mentioned above, the front rail 26 may be formed by a monolithic hot stamping process. For example, in operation 106 a blank may be heated from room temperature to approximately 900 degrees Celsius in a furnace to fully austenitize the blank. In operation 110, the heated blank may then be transferred to a die where the blank may be formed into a desired shape and rapidly cooled. In one example, the blank may be formed into a front rail for an underbody assembly, such as the front rail 26 described above. The blank may have a temperature of approximately 700-800 degrees Celsius and may be positioned within the die for cooling at approximately 100 degrees Celsius per second. Cooling the blank at this rate results in achieving a fully martensitic structure of the blank having a tensile strength of approximately 1300-1600 MPa at room temperature. Cooling times may vary based on a thickness of the blank.

In operation 114, the cooling process may be an annealing process or a quenching process. The annealing process is a slower process to use when equilibrium structures are desired. The quenching process is a faster process to use when non-equilibrium structures are desired. A typical hot stamping process may use the quenching process by applying water to the heated blank when positioned within the die. The front rail may be cooled to define varied strength zones.

Figure 6:
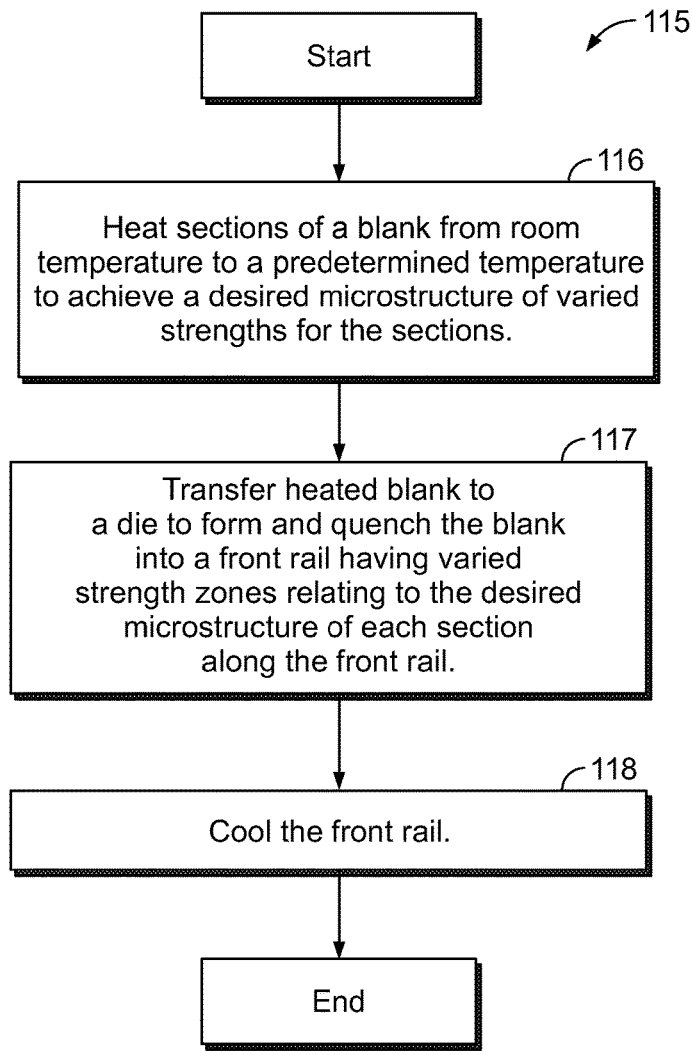
FIG. 6 is a flow chart showing an example of another method for creating a vehicle component.

FIG. 6 is a flow chart illustrating an example of a method of thermally treating a blank using a monolithic hot stamping process, referred to generally as a method 115. In operation 116, sections of a blank may be heated to a predetermined temperature to form a desired microstructure of varied strength for the sections. For example, one or more portions of the blank may be treated to a temperature above 900 degrees Celsius to achieve characteristics of a hard strength zone. A desired microstructure associated with the hard strength zone may be martensitic. One or more portions of the blank may be treated to a temperature between 700 and 900 degrees Celsius to achieve characteristics of a medium strength zone. A desired microstructure associated with the medium strength zone may include a distribution of ferrite, pearlite, martensite and bainite. One or more portions of the blank may be treated to a temperature below 700 degrees Celsius to achieve characteristics of a soft strength zone. A desired microstructure associated with a soft strength zone may be ferrite and/or pearlite.

In operation 117, the heated blank may then be transferred to a die where the blank may be formed and quenched into a desired shape. In one example, the blank may be formed into a front rail for an underbody assembly having varied strength zones, such as the front rail 26 described above.

In operation 118, the cooling process may be an annealing process or a quenching process. The annealing process is a slower process to use when equilibrium structures are desired. The quenching process is a faster process to use when non-equilibrium structures are desired. A typical hot stamping process may use the quenching process by applying water to the heated blank when positioned within the die. In operation 118, the front rail may be cooled by either a uniform cooling process or a cooling process tailored to portions of the blank.

Figure 7:
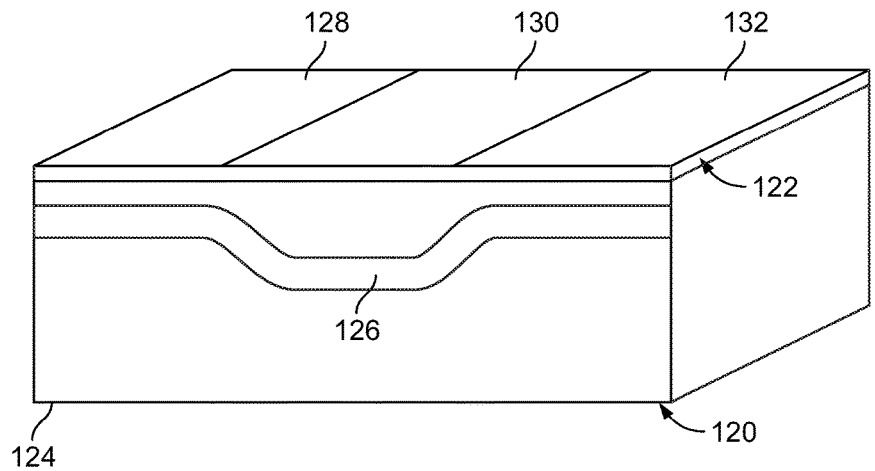
FIG. 7 is an illustrative schematic diagram showing an example of a die assembly and a blank.

The cooling portion of the hot stamping process may also use spacing between the blank and a cooling channel to obtain varied strength zones. For example, FIG. 7 shows an example of a die assembly 120 supporting a blank 122. A die 124 may include a coolant channel 126. The coolant channel 126 may be shaped within the die 124 to have varied spacing from the blank 122 to achieve varied material structures and strength zones of the blank 122. The blank 122 may have uniform properties across the blank 122 prior to being positioned with the die 124. Portions of the blank 122 located closer to the coolant channel 126 are subject to rapid cooling/quenching to obtain a martensitic structure. Portions of the blank 122 located further away from the coolant channel 126 are subject to a slower cooling/quenching to obtain a pearlite structure. In this example, the spacing and shape of the coolant channel 126 relative to the blank 122 may result in having a first martensitic portion 128, a pearlite portion 130, and a second martensitic portion 132.

Figure 8:
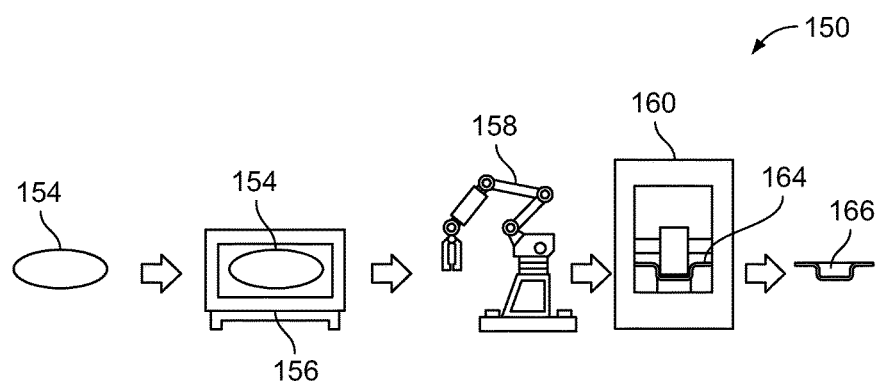
FIG. 8 is a diagrammatic view showing an example of a hot stamping process.

FIG. 8 is a diagrammatic view of an example of a hot-stamping line that may be used to manufacture an UHSS vehicle body component, referred to generally herein as a hot-stamping process 150. Hot-stamping, also known as hot forming or press hardening, is a process of stamping a blank while the metal is very hot, usually in excess of 600 degrees Celsius, and subsequently quenching the formed blank in a closed die. The hot-stamping process may convert low-strength blanks to high-strength components as described above. For example, the finished component may have a yield strength of about 150 to 230 kilo pounds per square inch.

In the hot-stamping process 150, a boron steel blank 154 (which may be press-hardenable steel) is placed in a furnace 156 and heated above a phase transformation temperature forming austenite. The phase transformation temperature is the transformation temperature at which ferrite fully transforms into austenite. For example, the blank 154 may be heated at 900 to 950 degrees Celsius for a predetermined time in the furnace 156. The bake time and furnace temperature may vary depending on the material of the blank 154 and desired properties of the finished part. After heating, a robotic transfer system 158 may transfer the blank 154, now austenitized, to a press 160 having a die 164. The die 164 stamps the blank 154 into a desired shape while the blank 154 is still hot to form one or more components 166 from the blank 154. The component 166 is then quenched while the die 164 is still closed using water or other coolant. Quenching is provided at a cooling speed of 30 to 150 degrees C./s for a predetermined duration at the bottom of the stroke. Quenching changes the microstructure of the blank from austenite to martensite. After quenching, the component 166 is removed from the press 160 while the component is still hot (e.g., about 150 degrees Celsius). The component 166 may then be cooled on racks.

A hot-stamping process may provide numerous advantages over other high-strength steel forming methods such as cold-stamping. One advantage of hot-stamping is a reduced spring back and warping of the blank. Hot-stamping also allows complex shapes to be formed in a single stroke of the die to reduce downstream processing and increase efficiency in the manufacturing of the vehicle component from the blank.

Hot-stamped components may be both lightweight and strong. Examples of automotive components that may be formed by hot-stamping include: body pillars, rockers, rails, bumpers, intrusion beams, carrier understructure, mounting plates, front tunnels, front and rear bumpers, reinforcement members, and side rails. Higher strength zones of the components provide increased resistance to deformation during an impact while softer zones may be place in locations where the component is to be attached to other components or where deformation is desired.

While various embodiments are described above, it is not intended that these embodiments describe all possible forms encompassed by the claims. The words used in the specification are words of description rather than limitation, and it is understood that various changes can be made without departing from the spirit and scope of the disclosure. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle underbody assembly comprising:
    a pair of front rails each including a front portion, a mid-portion, and a backup portion;
    a hinge pillar attached to each backup portion;
    a crush can attached to each front portion; and
    a bumper attached to each crush can via bumper supports,
    wherein the front and backup portions are heat treated to have a higher strength than the mid-portion spanning onto both sides of a rail bend-portion.

2. The assembly of claim 1, wherein each of the mid-portions has a strength tuned for hinge creation to absorb energy and minimize deformation into a respective rocker mounted to one of the hinge pillars and to absorb energy and minimize deformation into a respective hinge pillar when the bumper is subjected to an impact.

3. The assembly of claim 1, wherein the each of the front portions and each of the backup portions have a strength tuned to consolidate inner and outer reinforcements parts into inner and outer reinforcements of advanced high strength steel to support a vehicle power train and to balance an offset in load direction due to an outboard extending geometry of each of the front rails to a respective hinge pillar.

4. The assembly of claim 1, wherein each of the front rails is hot stamped and then cooled at a rate higher than a critical cooling rate to achieve a substantially full martensitic structure of the front portions and the backup portions.

5. The assembly of claim 1, wherein the front portion and the backup portion are heated to define a hard strength zone, and wherein the mid-portion is heated to define a medium strength zone.

6. The assembly of claim 1, wherein a region between one of the front portions and one of the backup portions is further defined as a location in which an upper end of the respective backup portion extends downward from the respective front portion.

7. The assembly of claim 1, wherein each of the front rails is thermally treated so that the mid-portion has a tensile strength less than the respective front portion and the respective backup portion or less than 1000 MPa.

8. The assembly of claim 1, wherein each of the front rails is thermally treated so that each of the front portions and the backup portions have a tensile strength greater than the mid-portions or between 1000 MPa and 1900 MPa.

9. A front rail for a vehicle underbody assembly comprising:
    a front portion for securing to a bumper assembly;
    a backup portion for securing to a hinge pillar; and
    a mid-portion extending between the front portion and backup portion on both sides of a rail bend-portion and thermally treated to define a medium strength zone,
    wherein the front portion and the backup portion are thermally treated to define a hard strength zone.

10. The assembly of claim 9, wherein the mid-portion is located adjacent an outboard extension of the backup portion and is thermally treated to provide an area for hinge creation to absorb energy from a vehicle front end impact.

11. The assembly of claim 9, wherein the medium strength zone is further defined as a zone in which a structure of the front rail includes portions of one or more of ferrite, pearlite, martensite, and bainite, and wherein the hard strength zone is further defined as a zone in which a structure of the front rail is martensitic.

12. The assembly of claim 9, wherein the front portion includes a front end for securing to a crush can.

13. The assembly of claim 9, wherein the mid-portion is cooled at a first cooling rate less than a second cooling rate of the front portion and the backup portion.

14. The assembly of claim 9, wherein thermal treatment of the portions includes a heating process in which the front portion and the backup portion are heated to define the hard strength zone, and wherein the thermal treatment of the portions includes a heating process in which the mid-portion is heated to define a medium strength zone.

15. The assembly of claim 9, wherein the mid-portion is heated to define a microstructure including one or more of ferrite, pearlite, martensite, and bainite.

16. A method for creating a vehicle component comprising:
    heating a first portion of a blank to a first temperature to define a first strength zone;
    heating a second portion of the blank to a second temperature to define a second strength zone; and
    transferring the blank after heating to a die to form a vehicle front rail,
    wherein the second strength zone is a medium strength zone spanning past both sides of a transition portion of the vehicle front rail extending between a front portion and a backup portion, and wherein the first strength zone is a hard strength zone including the front and backup portions.

17. The method of claim 16, wherein the first temperature is above an upper critical temperature of the blank.

18. The method of claim 16, wherein the second temperature is between a lower critical temperature and an upper critical temperature of the blank.

* * * * *